United States Patent
Tripathi et al.

(10) Patent No.: US 6,801,043 B2
(45) Date of Patent: Oct. 5, 2004

(54) TIME DOMAIN REFLECTOMETRY BASED TRANSMITTER EQUALIZATION

(75) Inventors: Alok Tripathi, Beaverton, OR (US); Ken Drottar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/326,739

(22) Filed: Dec. 20, 2002

(65) Prior Publication Data

US 2004/0119482 A1 Jun. 24, 2004

(51) Int. Cl.⁷ .............................................. G01R 27/26
(52) U.S. Cl. .................................... 324/642; 324/647
(58) Field of Search .............................. 324/538, 539, 324/642, 646, 641, 647; 375/257; 385/89

(56) References Cited

U.S. PATENT DOCUMENTS

| | | | | |
|---|---|---|---|---|
| 3,617,877 A | * | 11/1971 | Hobson | ...................... 324/642 |
| 6,323,654 B1 | * | 11/2001 | Needle et al. | ............... 324/534 |
| 6,534,996 B1 | * | 3/2003 | Amrany et al. | .............. 324/533 |
| 6,566,889 B2 | * | 5/2003 | Warke | ......................... 324/527 |
| 6,675,328 B1 | * | 1/2004 | Krishnamachari et al. | .. 714/704 |
| 2002/0089335 A1 | * | 7/2002 | Williams | ..................... 324/533 |
| 2003/0231023 A1 | * | 12/2003 | Belge et al. | ................. 324/637 |

* cited by examiner

Primary Examiner—Anjan Deb
Assistant Examiner—Walter Benson
(74) Attorney, Agent, or Firm—Buckley, Maschoff & Talwalker LLC (57) ABSTRACT

According to some embodiments, time domain reflectometry based transmitter equalization is provided. For example, a reflection detector in a transmitter may detect a reflection signal associated with a calibration signal that was transmitted via an interconnect. The reflection detector may then provide filter information to a transmitting unit to facilitate a transmission of data to a remote receiver via the interconnect. According to some embodiments, the receiver adjusts a termination impedance before the calibration signal is transmitted.

25 Claims, 8 Drawing Sheets

TIME DOMAIN REFLECTOMETRY BASED TRANSMITTER EQUALIZATION

BACKGROUND

A transmitter can transmit information to a receiver via an interconnect (e.g., a wire or a printed circuit board trace). By way of example, an Application Specific Integrated Circuit (ASIC) device may transmit a stream of one-bit symbols (each symbol being represented by a low voltage indicating a "0" or a high voltage indicating a "1") to another ASIC device via a serial point-to-point interconnect.

Depending on the characteristics of the interconnect, however, a symbol could be misinterpreted by the receiver because of lingering effects associated with symbols that were previously transmitted via the interconnect. For example, a significant amount of voltage might remain on the interconnect after a long series of 1s are transmitted. As a result, a receiver to mistakenly interpret a newly transmitted 0 as a 1. Such problems, referred to as Inter-Symbol Interference (ISI), can limit that rate at which information can be accurately transmitted via the interconnect.

The amount of ISI associated with an interconnect may be due to interconnect frequency dependent insertion loss characteristics (which can be especially poor with respect to printed circuit board technology). Moreover, the ISI problem may worsen as data transfer application speeds increase.

To reduce ISI, it is known that a passive equalization network can be designed and connected to an interconnect. Such an approach, however, may introduce additional insertion loss in the link. Moreover, the network topology, and the values of associated components, is highly dependent on the insertion loss characteristics of the particular interconnect (which might not be known at the time the passive equalization network is designed).

Similarly, it is known that active equalization may be implemented at a transmitter (e.g., pre-emphasis) or receiver to reduce ISI. For example, an adaptive-tapped-delay-line filter may be designed to cancel out frequency dependent loss characteristics of an interconnect. In this case, however, the appropriate filter coefficients will depend on the particular interconnection media and topology (which might not be known at the time the filter is designed).

DETAILED DESCRIPTION

Some embodiments described herein are associated with an "interconnect." As used herein the term "interconnect" refers to any path through which data is transmitted. An interconnect may be associated with, for example, a serial point-to-point interface between a transmitter and a receiver (e.g., ASIC devices). Note that an interconnect may comprise a wire, a printed circuit board trace, or any other media (and combinations of media). Moreover, an interconnect may be associated with a single-ended interface or a differential interface.

System

Figure 1:
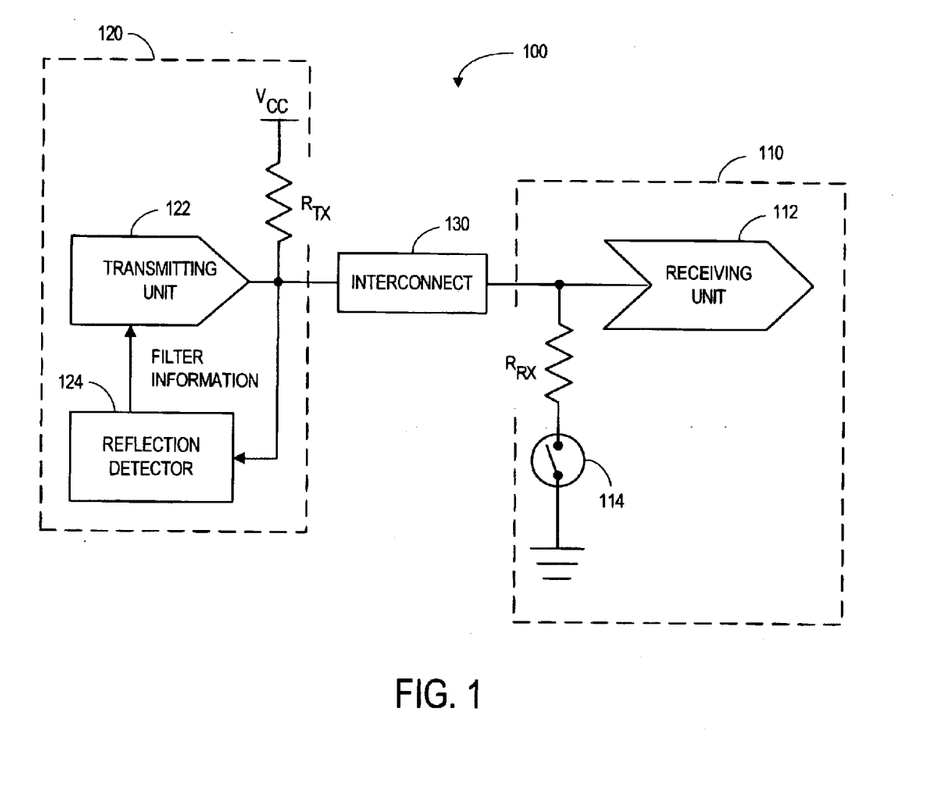
FIG. 1 is a block diagram of a system in accordance with some embodiments.

FIG. 1 is a block diagram of a system 100 in accordance with some embodiments. In particular, a receiver 110 receives data from a transmitter 120 via an interconnect 130. The receiver 110 includes a receiving unit 112 to receive data and a termination impedance RRX coupled to ground. According to some embodiments, the receiver 110 also includes a switch 114 to adjust the termination impedance. For example, the switch 114 may adjust the termination impedance to a relatively high value when it is determined that a calibration is to be performed (e.g., the switch 114 may be opened to disconnect RRX from ground).

The receiver 110 may also include a calibration status determination unit (not shown in FIG. 1) to control the switch 114 based on, for example, a start-up process and/or a delay. For example, the receiver 110 may open the switch 114 for a pre-determined period of time after powering up and/or after detecting the presence of the transmitter 120. After the pre-determined period of time, the receiver 110 may close the switch 114 (e.g., to enable normal operation). According to another embodiment, the receiver 110 controls the switch in accordance with a calibration indication signal received from the transmitter 120 via the interconnect 130 (e.g., a start pulse). Note that the calibration indication signal may indicate that a calibration is about to be performed (e.g., the switch 114 should be opened) or that a calibration has already been performed (e.g., the switch 114 should be closed). Also note that the calibration indication signal may also have another function (e.g., a signal associated with a protocol or a calibration signal itself could also act as a calibration indication signal).

The transmitter 120 include a transmitting unit 122 to transmit data and a termination impedance $R_{TX}$ coupled to a power supply ($V_{CC}$). According to some embodiments, the transmitter 120 also includes a reflection detector 124 to detect a reflection signal associated with a calibration signal transmitted via the interconnect 130. For example, the transmitting unit 122 might transmit a voltage step signal via the interconnect 130 while the switch 114 in the receiver 110 is open. In this case, the reflection detector 124 would detect the reflection of that voltage step signal.

Moreover, according to some embodiments, the transmitting unit 122 facilitates a transmission of data via the interconnect 130 in accordance with the reflection signal. For example, the reflection detector 124 may generate filter information (e.g., adaptive filter coefficients) based on the detected reflection signal. The transmitting unit 122 can then use the filter information (which was determined based on a reflection signal detected when the switch 114 is open) to adjust the shape of a signal associated with transmitted data (which will be transmitted when the switch 114 is closed).

Figure 2A:
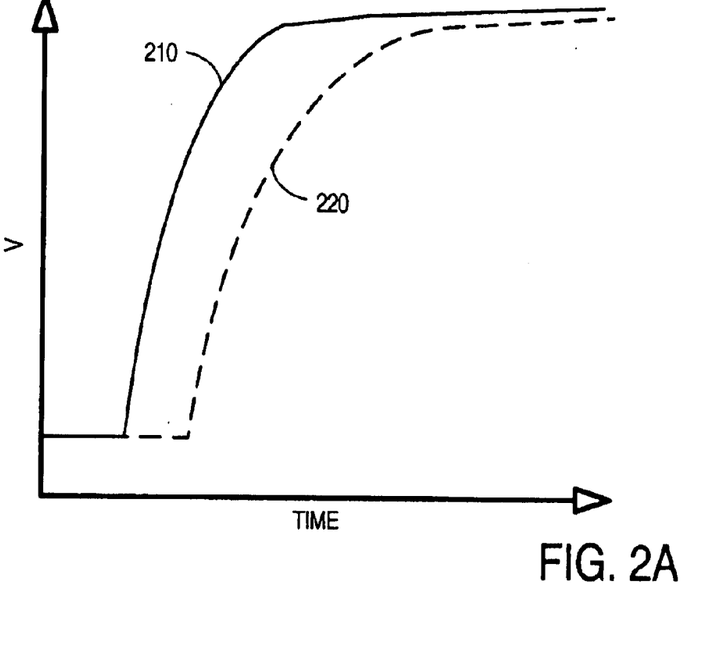
FIGS. 2A and 2B illustrate waveforms associated with an interconnect according to some embodiments.
Figure 2B:
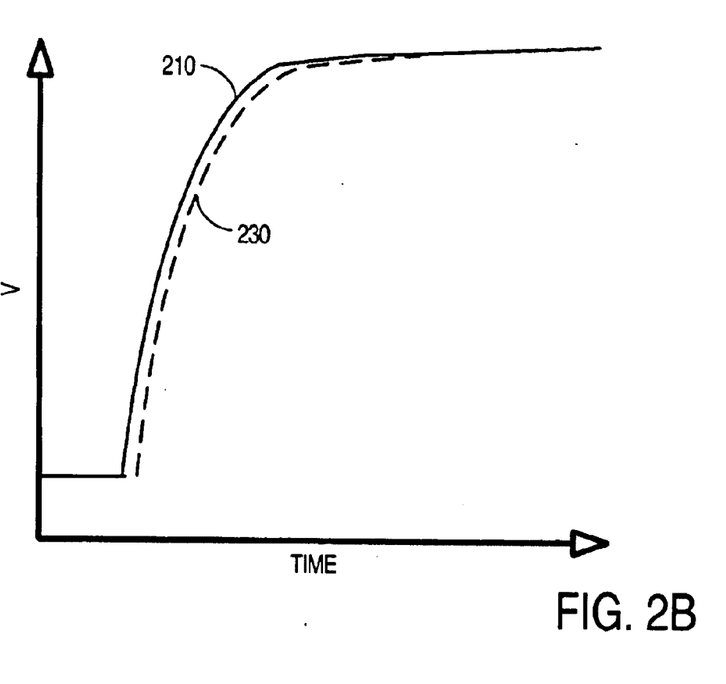

Consider, for example FIGS. 2A and 2B which illustrate waveforms associated with the interconnect 130 according to some embodiments. In particular, FIG. 2A includes a transmitted signal waveform 210 (a voltage step signal transmitted when the switch 114 is closed) along with a reflection signal waveform 220 (e.g., a reflection of a voltage step signal when the switch 114 is open).

Note that there may be a relationship between the two waveforms 210, 220- and that this relationship might be used to facilitate a transmission of data via the interconnect 130. For example, FIG. 2B shows the similarity between the transmitted signal waveform 210 and a time-compressed (by a factor of two), time-shifted version of the reflection signal waveform 230. This may be the case, for example, for reasonable impedance matched very lossy interconnection media. According to some embodiments, the shape of the waveform 230 is used to determine filter coefficients (e.g., filter delays) that adjust a signal associated with transmitted data (e.g., adjusting the signal to counteract and reduce ISI).

Methods

Figure 3:
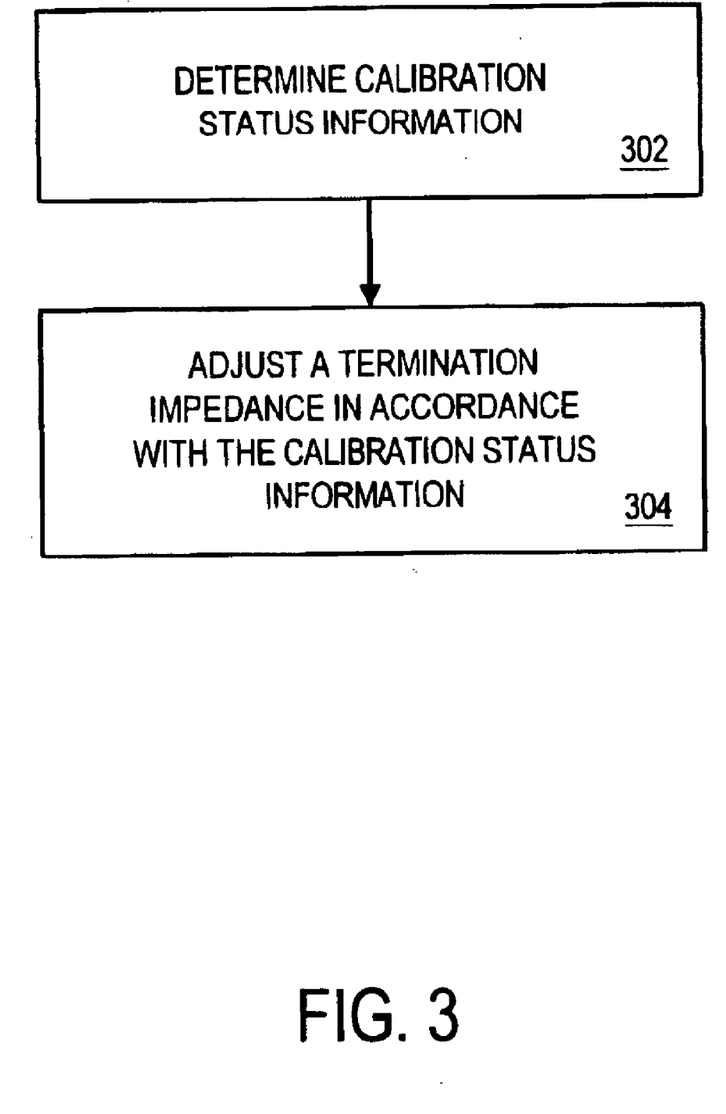
FIG. 3 is a flow chart of a method performed by a receiver according to some embodiments.

FIG. 3 is a flow chart of a method performed by the receiver 110 according to some embodiments. Note that the flow charts described herein do not necessarily imply a fixed order to the actions, and embodiments may be performed in any order that is practicable. At 302, calibration status information is determined. For example, the receiver 110 may determine the calibration status information based on a start-up process (e.g., associated with powering up and/or detecting that the transmitter 120 is present), a calibration indication signal received from the transmitter 120, and/or a delay (e.g., a pre-determined period of time).

At 304, a termination impedance is adjusted in accordance with the calibration status information. For example, the switch 114 may be opened to disconnect $R_{RX}$ from ground (e.g., resulting in a relatively high termination impedance value).

Figure 4:
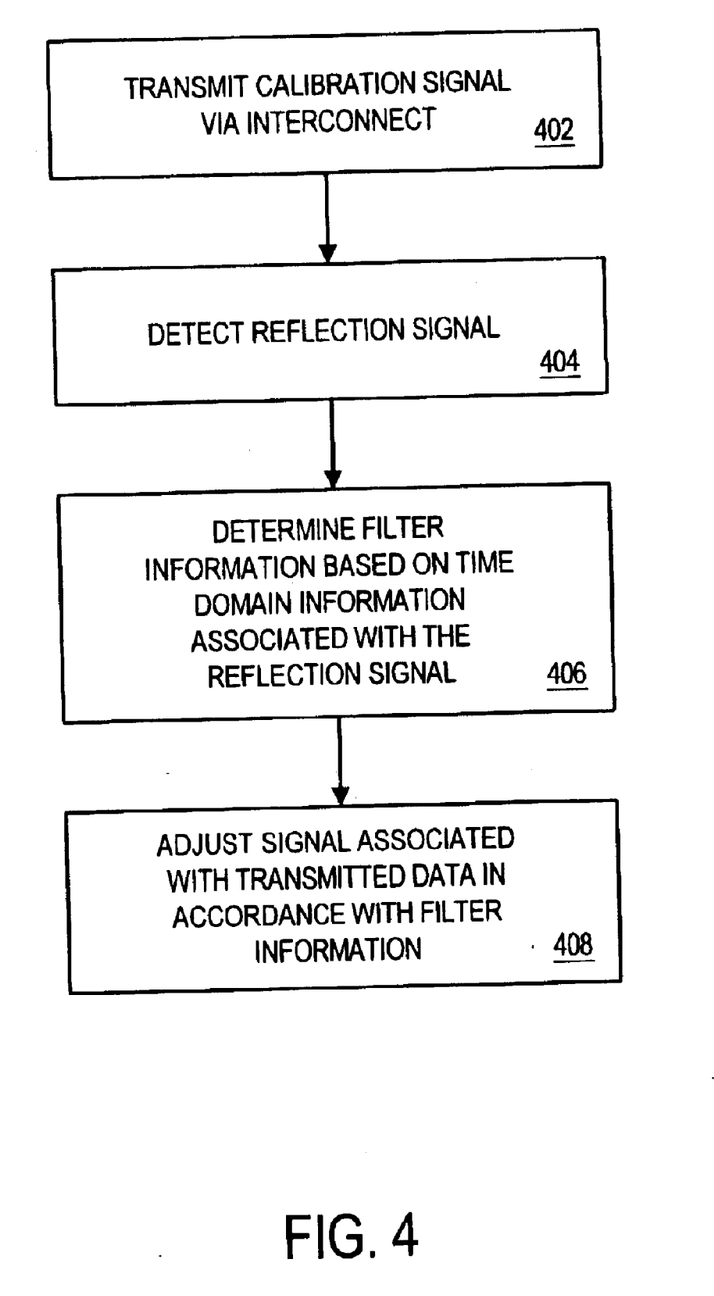
FIG. 4 is a flow chart of a method performed by a transmitter according to some embodiments.

FIG. 4 is a flow chart of a method performed by the transmitter 120 according to some embodiments. At 402, a calibration signal is transmitted via the interconnect 130. For example, the transmitting unit 122 may transmit a voltage step signal via the interconnect 130. Note that the switch 114 in the receiver 110 be can open (or in a high-impedance state) during the calibration process.

At 404, a reflection signal associated with the calibration signal is detected. For example, the reflection detector 124 may detect the waveform of the reflection signal and store information associated with the shape of the waveform.

At 406, filter information is determined based on time domain information associated with the reflection signal (e.g., time compressed and/or time shifted time domain information). For example, the reflection detector 124 may determine a number of time intervals (e.g., clock cycles delays) in accordance with the reflection signal, each time interval being associated with a pre-determined voltage level. These time intervals can then be used by the transmitting unit 122 to adjust a signal associated with the transmitted data as appropriate.

According to another embodiment, the reflection detector 124 instead determines a number of voltage levels in accordance with the reflection signal, each voltage level being associated with a pre-determined time interval. According to still another embodiment, both time intervals and voltage levels are determined in accordance with the reflection signal (e.g., and both are used by the transmitting unit 122 to adjust the signal associated with the transmitted data as appropriate).

At 408, data is transmitted via the interconnect 130, and a signal associated with the data is adjusted based on the reflection signal (e.g., the voltage of the signal is pulled-down as appropriate to reduce ISI). Note that the switch 114 in the receiver 110 can be closed before the data is transmitted (e.g., now that the calibration process is over). The switch 114 may instead change the impedance from a high-impedance state to a termination impedance state.

Reflection Detector

Figure 5:
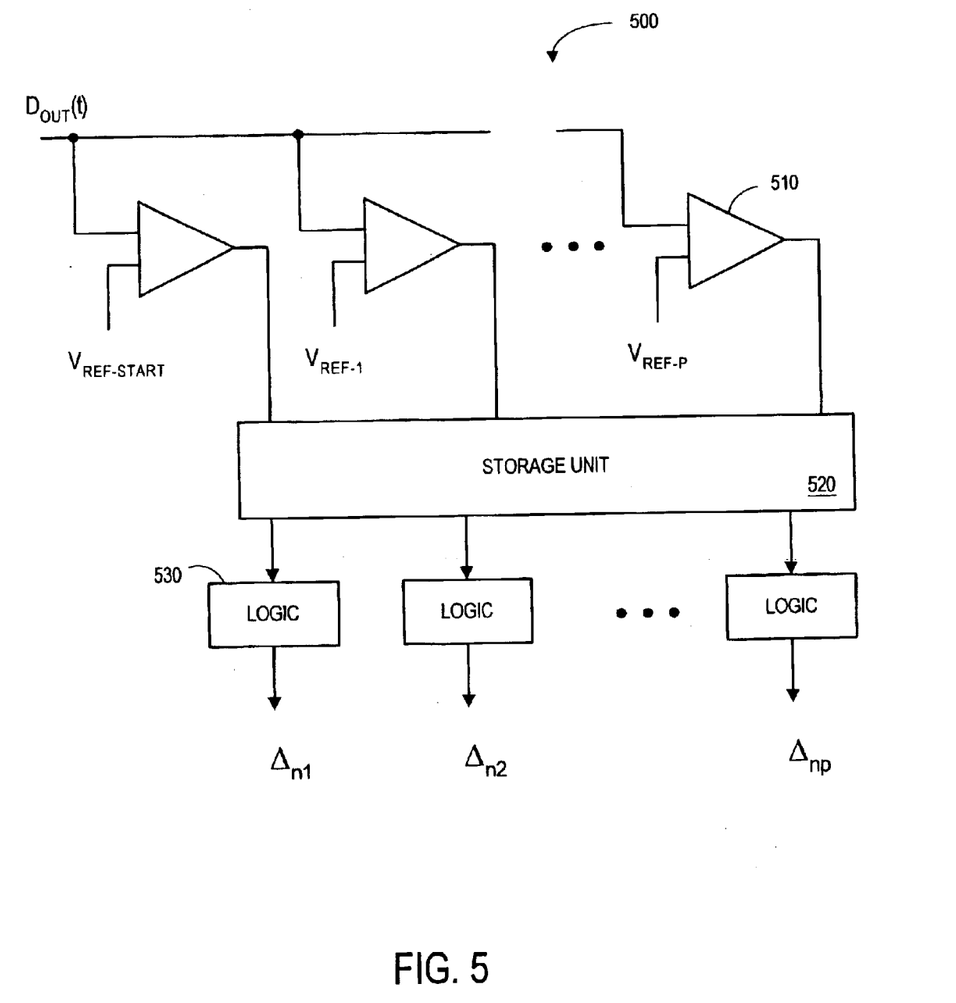
FIG. 5 is a reflection detector circuit according to one embodiment.
Figure 6:
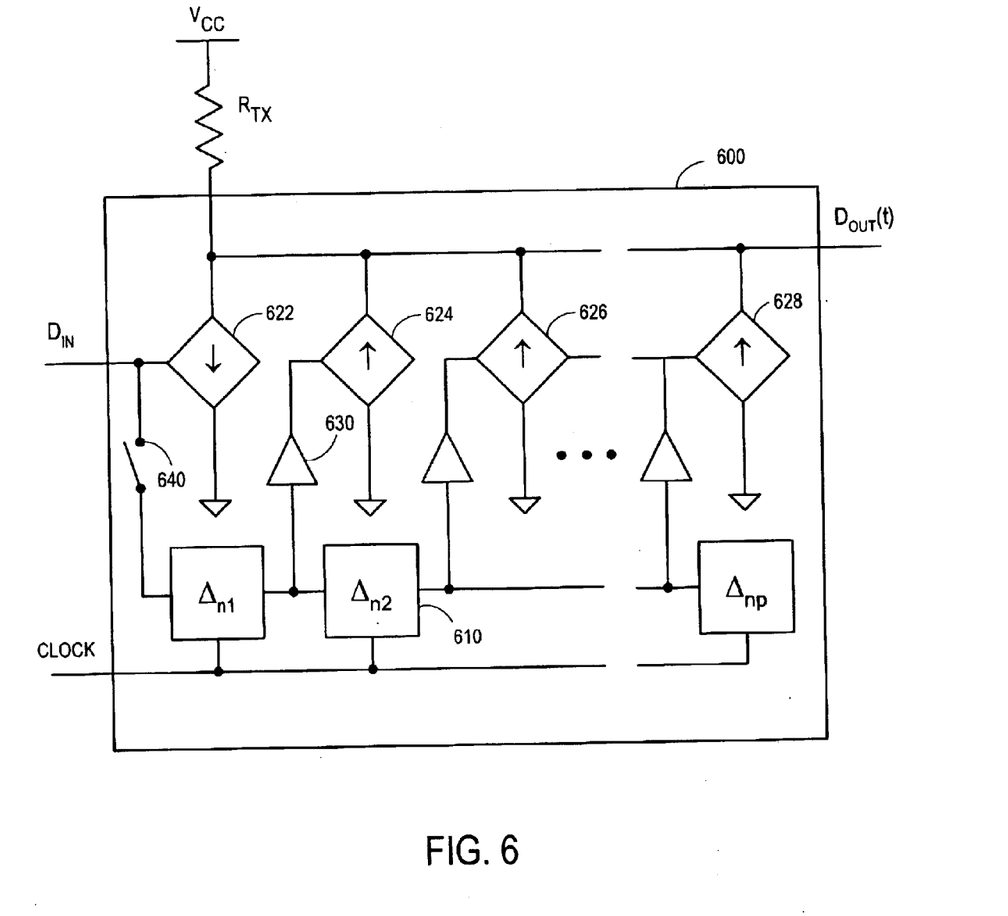
FIG. 6 is a transmitting unit circuit according to one embodiment.

FIGS. 5 and 6 illustrate examples of a circuits associated with a transmitter 120 according to one embodiment. In particular, a reflection detector circuit 500 determines a number of time intervals (e.g., filter delay coefficients) in accordance with a reflection signal, each time interval being associated with a pre-determined voltage level. These time intervals are then used by a transmitting unit 600 to adjust a signal associated with transmitted data as appropriate.

FIG. 5 is the reflection detector circuit 500 according to this embodiment. The circuit 500 includes a number of linear comparators 510. Each linear comparator receives the reflection signal from an interconnect output line (i.e., $D_{OUT}(t)$) along with a one of a plurality of pre-determined reference voltages (i.e., $V_{REF\text{-}START}$, $V_{REF\text{-}1}$, . . . , and $V_{REF\text{-}P}$). The references voltages may, for example, be generated by a voltage divider circuit that is designed to reduce any voltage variation caused by temperature and/or process variations.

The circuit 500 also includes a storage unit 520 to receive information from the linear comparators 510 along with a detector clock signal. The storage unit 520 may comprise, for example, a bank of flip flops, counters, and/or registers that store information associated with the shape of a reflection signal (e.g., associated with the transition of the reference signal through the reference voltages). Note that the detector clock signal may have a frequency that is lower than a transmitter clock signal frequency (e.g., resulting in time compressed version of the reflection signal waveform). The detector clock frequency may have a value, for example, of at least f/2 or an integer multiple of f/2.

The circuit 500 also includes logic units 530 to generate a number of time delay values (i.e., $\Delta_{n1}$, $\Delta_{n2}$, . . . , and $\Delta_{np}$) based on information in the storage unit 520. The delay values may represent, for example, integer multiples of a clock cycle that will be used as filter coefficients. As a result of the linear comparators 510, the storage unit 520, and the logic 530, the circuit 500 may act as a reflected voltage waveform vs. time detection system.

Transmitting Unit

FIG. 6 is a transmitting unit circuit 600 according to one embodiment. In particular, the circuit 600 comprises a multi-bit adaptive gain-delay-line based wave-shape current source transmitter.

The circuit 600 includes a variable delay line formed by a number of delay elements 610. Each delay element 610 receives a transmitter clock signal and is associated with a time delay value (i.e., $\Delta_{n1}$, $\Delta_{n2}$, ..., and $\Delta_{np}$ as generated by the reflection detector circuit 500). Recall that the transmitter clock signal may have a frequency higher than the detector clock frequency. For example, the transmitter clock signal may have a frequency of f while the detector clock signal has a frequency of f/2. In this case, the time domain information associated with the reflection signal would be compressed by a factor of two.

The circuit 600 also includes a number of variable gain current sources 622, 624, 626, 628 coupled to an interconnect output line (i.e., a line receives an input data bit $D_{IN}$ and provides $D_{OUT}(t)$ to the interconnect). Note that each current source may be associated with a gain (i.e., $\alpha_0$ through $\alpha_p$) that was selected during design of the circuit 600. The delay elements 610 control the current sources 622, 624, 626, 628 through buffers 630 so as to adjust a signal transmitted via the interconnect output line (i.e., turning the input data bit $D_{IN}$ into $D_{OUT}(t)$). Note that a switch 640 that can be opened to disable adjustments by the current sources 622, 624, 626, 628 (e.g., to prevent adjustment to a calibration signal).

When the switch 640 is closed, the circuit 600 adjusts the signal transmitted via the interconnect output line by introducing appropriate amounts of opposing current (at appropriate times) in order to cancel ISI. In particular, the first current source 622 receives input data bit $D_{IN}$ and provides $\alpha_0 D_{IN}$. After a delay of $\Delta_{n1}$, the second current source 624 provides $\alpha_1 \overline{D}_{IN}(\Delta_{n1})$. Similarly, after a delay of $\Delta_{n2}$, the third current source 626 provides $\alpha_2 \overline{D}_{IN}(\Delta_{n1}+\Delta_{n2})$. The final current source 628 provides $\alpha_P \overline{D}_{IN}(\Delta_{n1}+\ldots+\Delta_{np})$ after a delay of $\Delta_{np}$.

Figure 7:
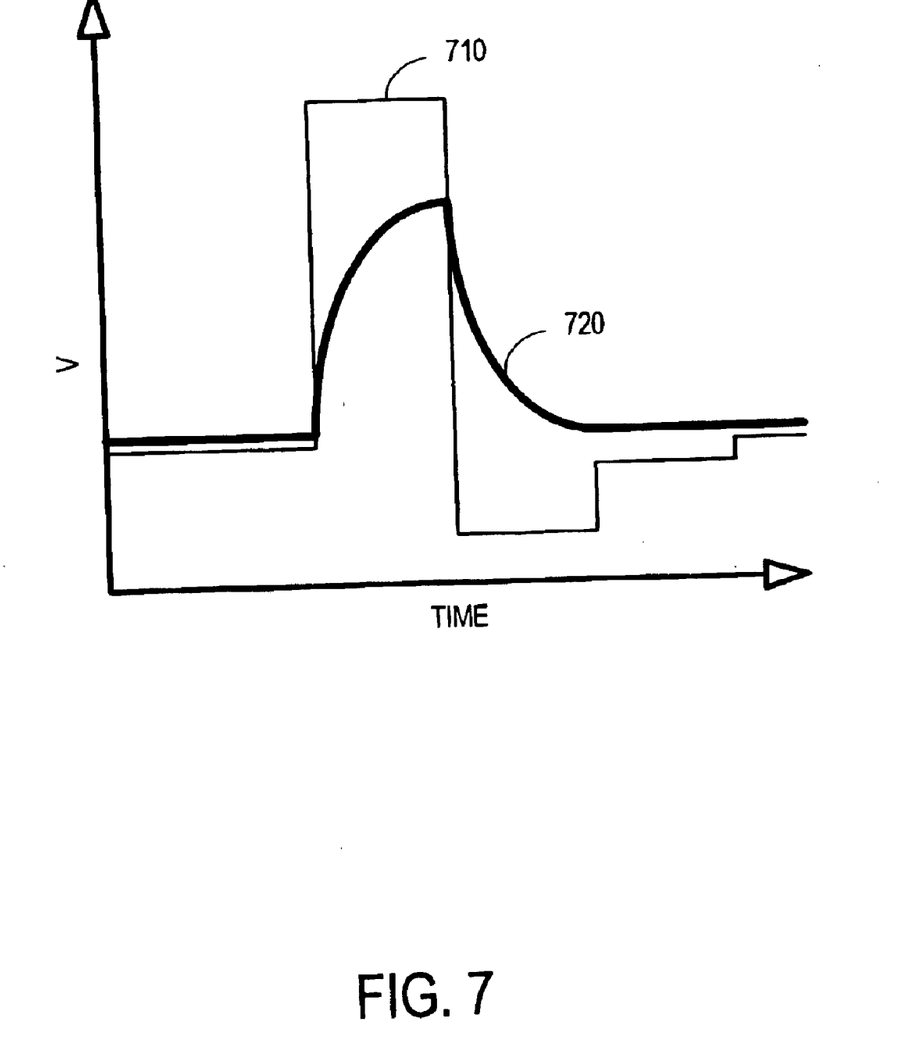
FIG. 7 illustrates waveforms associated with transmitted data according to some embodiments.

FIG. 7 illustrates waveforms associated with transmitted data according to some embodiments. In particular, one waveform 710 represents a signal associated with data being transmitted (e.g., $D_{OUT}(t)$) and another waveform 720 represents the signal received by a receiver (e.g., after traveling through an interconnect). Note that the waveforms 710, 720 may represent information from a single filter tap in connection with a lone pulse transmitted via the interconnect.

After increasing to a high voltage (e.g., to represent a 1), the transmitting unit 600 pulls down the transmitted waveform 710 (e.g., to a voltage lower than would be used to represent a 0) for a first period of time. The waveform 710 is then pulled down a less amount for a second period of time. According to some embodiments, these periods of time have been determined based on a reflected signal such that the waveform 710 will reduce ISI for a particular interconnect and/or topology. That is, by pulling the waveform 710 by appropriate amounts for appropriate periods of time, the value of the received waveform 720 may be controlled to reduce ISI.

Consider, by way of example, the initial operation of a transmitter (e.g., after powering up). In this case, the switch 640 is opened (to prevent the current sources 622, 624, 626, 628 from adjusting a signal on the interconnect output line). Moreover, the switch 114 in the receiver 110 is opened.

The input data bit DIN then transitions from 0 to 1 in order to generate a voltage step signal. The reflection detector circuit 600 samples $D_{OUT}(t)$ using a clock that runs at a speed half of the transmitting unit circuit's data rate to obtain information that is time compressed by a factor of two. The timing information in terms of clock cycle delays ($\Delta_{ni}$) for the reflected voltage cross-over points with reference to a set of reference voltages is captured by the linear comparators 510, the storage unit 520, and the logic 530 in the reflection detector circuit 500. Note that the appropriate references voltages ($V_{REF-i}$), voltage to current coefficients ($\alpha_i$), output voltage swing, termination impedance, and the link allowable loss may all be dependent on each other and may be defined during design of the system.

The delay information is then fed to the variable delay line in the transmitting unit circuit 600. The switch 640 is closed (to let the current sources 622, 624, 626, 628 adjust a signal on the interconnect output line) and the switch 114 in the receiver I 10 is closed or returns to a termination impedance state (to enable normal operation). According to some embodiments, the reflection detector circuit 500 is also disabled at this point. The transmitting unit circuit 600 then begins adjusting a signal associated with transmitted data in order to reduce ISI.

System of Network Devices

Figure 8:
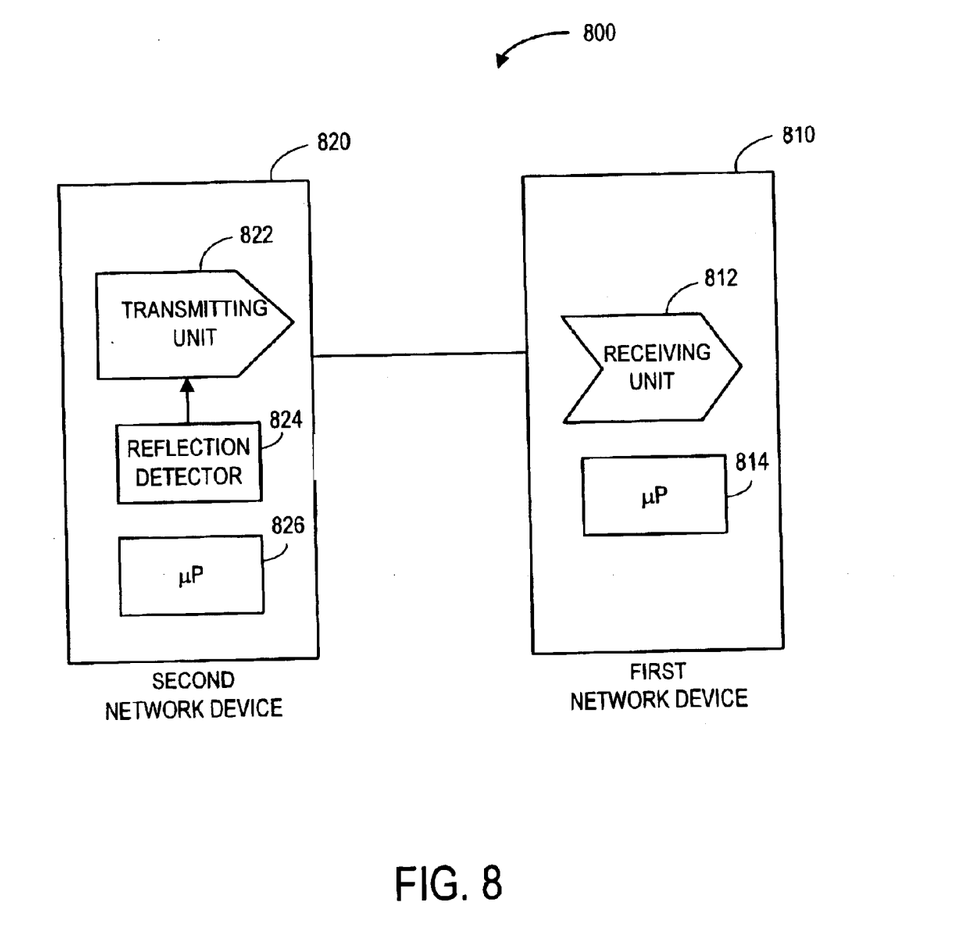
FIG. 8 is a system including network devices according to some embodiments.

FIG. 8 is a system 800 including a first network device 810 and a second network device 820 according to some embodiments. In particular, the first network device 810 may receive information from the second network device 820 (e.g., via an interconnect). The first network device 810 includes a receiving unit 812, and a microprocessor 814. The microprocessor 814 may, for example, execute an application that receives data from the second network device 820. The second network device 820 includes a transmitting unit 822, a reflection detector 824, and a microprocessor 826. The microprocessor 826 may, for example, execute an application that transmits data to the first network device 810.

Moreover, the first network device 810 and/or the second network device 830 may operate in accordance with any of the embodiments described herein (e.g., as described with respect to FIGS. 1 through 7). For example, the second network device 820 may detect a reflection signal associated with a calibration signal and facilitate a transmission of data to the first network device 810 in accordance with the reflection signal.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although some embodiments described herein discuss a single calibration signal, according to other embodiment a number of calibration signals may be used (e.g., a training sequence). Moreover, the calibration signals may have other shapes than described herein. Further, the calibration signals may comprise a pre-determined pattern or also have other purposes (e.g., they may comprise protocol signals, calibration indication signals to the receiver and/or data signals). In addition, although some embodiments described herein discuss a calibration process performed during power-up, according to other embodiments the calibration process may be performed periodically or when selected by an operator.

Moreover, although some embodiments described herein are associated with a single-ended interface, embodiments may also be directed to a differential interface.

Further, although some embodiments described herein are associated with a transmitter that adjusts filter coefficients, according to other embodiments a receiver may adjust filter coefficients based on a reflection signal.

Also note that finer (or coarser) waveform sampling and ISI cancellation may be implemented using a higher (or lower) detector clock frequency as compared to the transmitter clock frequency.

In some embodiments described herein the reflection detector 124 determines a number of time intervals (e.g., clock cycles delays) in accordance with the reflection signal, each time interval being associated with a pre-determined voltage level. Note, however, that according to other embodiments, the reflection detector 124 may instead determine a number of voltage levels in accordance with the reflection signal, each voltage level being associated with a pre-determined time interval. In this case, the delays ($\Delta_{ni}$) may be predetermined (e.g., established during design of the system) and the ($\alpha_i$) may be calculated as appropriate based on the reflection signal.

Further, although software or hardware are described as performing certain functions herein, such functions may be performed using either software or hardware—or a combination of software and hardware.

The several embodiments described herein are solely for the purpose of illustration. Persons skilled in the art will recognize from this description other embodiments may be practiced with modifications and alterations limited only by the claims.

What is claimed is:

1. A method, comprising:
   transmitting a calibration signal from a transmitter to a remote receiver via an interconnect;
   detecting at the transmitter a reflection signal associated with the calibration signal; and
   adjusting a magnitude of a data signal in accordance with the reflection signal in order to adjust a shape of the data signal as the data signal travels via the interconnect.

2. The method of claim 1, wherein said adjusting is based on time domain information associated with the reflection signal.

3. The method of claim 2, wherein the time domain information is time compressed.

4. The method of claim 3, wherein the time domain information is time shifted.

5. The method of claim 2, further comprising:
   determining a plurality of time intervals and associated voltage levels in accordance with the time domain information.

6. The method of claim 1, further comprising:
   determining a plurality of voltage levels in accordance with the reflection signal, each voltage level being associated with a pre-determined time interval.

7. The method of claim 1, wherein the interconnect comprises one of: (i) a wire and (ii) a circuit board trace.

8. The method of claim 1, wherein the calibration signal is a voltage step signal.

9. The method of claim 1, further comprising:
   arranging to have a receiver adjust a termination impedance before the calibration signal is transmitted.

10. The method of claim 1, wherein said adjusting does not adjust a frequency associated with the data being transmitted to the receiver.

11. The method of claim 1, wherein a multi-bit adaptive-tapped-delay-line-filter adjusts the signal, and filter delay coefficients are determined based the reflection signal.

12. The method of claim 1, wherein said transmitting is associated with a serial interface.

13. The method of claim 12, wherein the serial interface is one of: (i) a single-ended interface, and (ii) a differential interface.

14. A method, comprising:
   determining data to be transmitted from a transmitter to a remote receiver via an interconnect at a pre-determined frequency, wherein the data is to be processed by the receiver; and
   transmitting the data via the interconnect at the pre-determined frequency and in accordance with a reflection signal detected via the interconnect wherein a magnitude of a signal associated with the data is adjusted based on time domain information associated with the reflection signal in order to adjust a shape of the signal as the signal travels through the interconnect.

15. An apparatus, comprising:
   a reflection detector to detect a reflection signal associated with a calibration signal transmitted via an interconnect; and
   a transmitting unit to adjust a maanitude of a data signal in accordance with the reflection signal in order to adjust a shape of the signal as the signal travels via the interconnect.

16. An apparatus, comprising:
   a reflection detector to detect a reflection signal associated with a calibration signal transmitted via an interconnect, including:
      a plurality of linear comparators, each linear comparator to receive the reflection signal from an interconnect output line along with a one of a plurality of pre-determined reference voltages,
      a storage unit to receive information from the linear comparators along with a detector clock signal, and
      logic units to generate a plurality of time delay values based on information in the storage unit; and
   a transmitting unit to facilitate a transmission of data via the interconnect in accordance with the reflection signal.

17. The apparatus of claim 1, wherein the detector clock signal has a frequency that is lower than a transmitter clock signal frequency.

18. An apparatus, comprising:
   a reflection detector to detect a reflection sianal associated with a calibration signal transmitted via an interconnect; and a transmitting unit to facilitate a transmission of data via the interconnect in accordance with the reflection signal, wherein the transmitting unit comprises a multi-bit adaptive gain-delay-line based wave-shape current source transmitter.

19. An apparatus, comprising:

a reflection detector to detect a reflection signal associated with a calibration signal transmitted via an interconnect; and a transmitting unit to facilitate a transmission of data via the interconnect in accordance with the reflection signal, wherein the transmitting unit comprises:
  a plurality of variable gain current sources coupled to an interconnect output line, wherein the variable gain current sources are to adjust a signal transmitted via the interconnect output line, and
  a variable delay line to control the variable gain current sources.

20. The apparatus of claim 19, wherein the variable delay line receives a transmitter clock signal and comprises a plurality of delay elements, each delay element being associated with a time delay value.

21. The apparatus of claim 19, wherein the transmitting unit includes a switch to prevent adjustment to a calibration signal.

22. A transmitter, comprising:

a reflection detector, including:
  a plurality of linear comparators, each linear comparator to receive a reflection signal from an interconnect output line along with a one of a plurality of predetermined reference voltages,
  a storage unit to receive information from the linear comparators along with a detector clock signal, and
  logic units to generate a plurality of time delay values based on information in the storage unit; and a transmitting unit, including:
  a plurality of variable gain current sources coupled to the interconnect output line, wherein the variable gain current sources are to adjust a signal transmitted via the interconnect output line, and
  a variable delay line to control the variable gain current sources, wherein the variable delay line comprises a plurality of delay elements, each delay element being associated with one of the time delay values.

23. The transmitter of claim 22, wherein the time delay values are associated with a transmitter clock signal that is provided to the variable delay line.

24. A network device, comprising:

a microprocessor to execute an application that exchanges data;

a reflection detector to detect a reflection signal associated with a calibration signal transmitted via an interconnect; and a transmitting unit to adjust a magnitude of a data signal being transmitted to a remote receiver in accordance with the reflection signal in order to adjust a shane of the signal as the signal travels via the interconnect.

25. The network device of claim 24, further comprising:

a calibration status determination unit to determine calibration status information; and a switch to adjust a termination impedance in accordance with the calibration status information.

* * * * *